Patented Aug. 4, 1925.

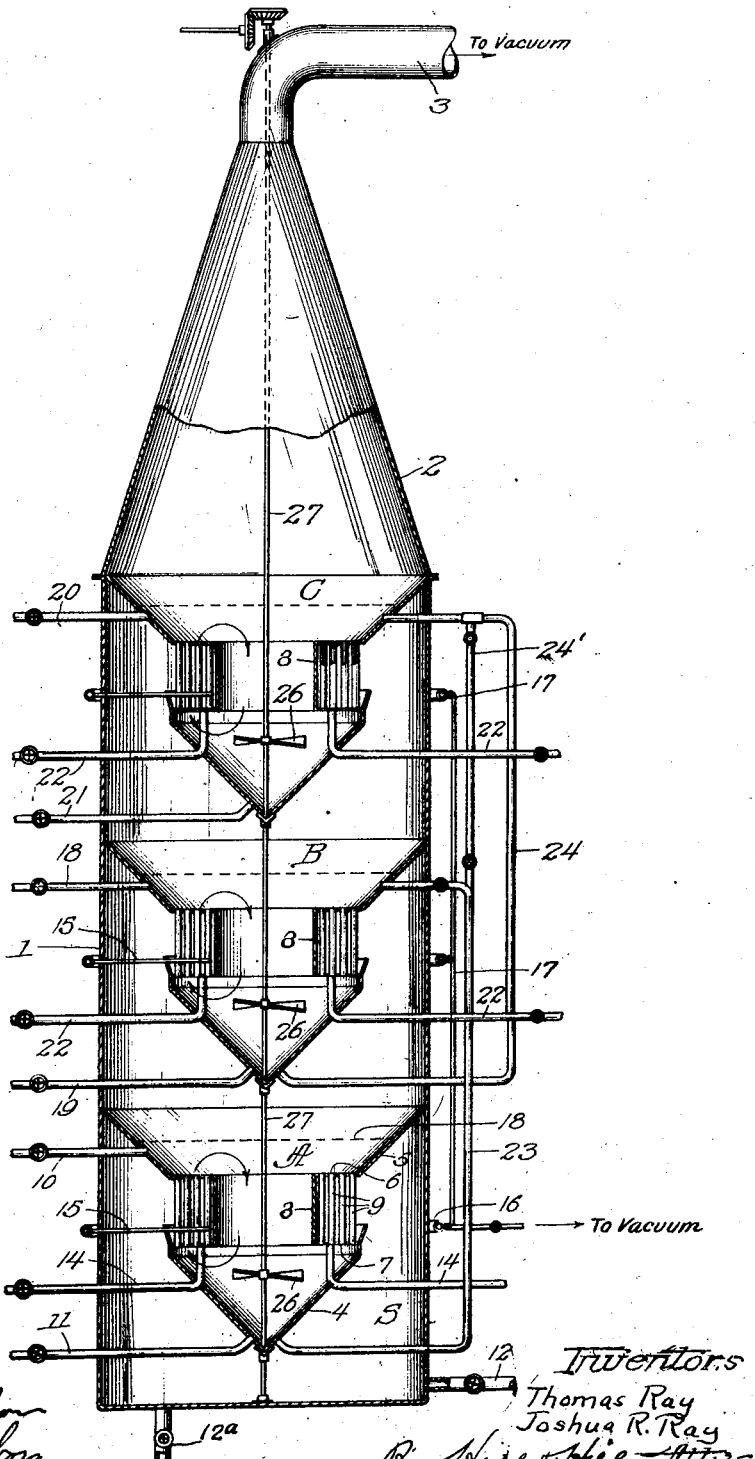

1,548,063

UNITED STATES PATENT OFFICE.

JOSHUA R. RAY AND THOMAS RAY, OF MANISTEE, MICHIGAN, ASSIGNORS TO RAY BROS. CORPORATION, OF NEW YORK, N. Y., A CORPORATION OF NEW YORK.

EVAPORATING APPARATUS.

Application filed May 13, 1918. Serial No. 234,157.

*To all whom it may concern:*

Be it known that we, JOSHUA R. RAY and THOMAS RAY, citizens of the United States, residing at Manistee, in the county of Manistee and State of Michigan, have invented certain new and useful Improvements in Evaporating Apparatus, of which the following is a description.

Our invention belongs to that general class of devices known as evaporating apparatus or concentrators and relates particularly to apparatus especially adapted for use in the manufacture of sugar, but its use, however, is not confined to the manufacture of this article, as it may be used wherever found applicable.

The invention has among its objects the production of an apparatus of the kind described that is simple, efficient, compact, durable and satisfactory. Many other objects and advantages of the construction herein shown and described will be obvious to those skilled in the art from the disclosures herein given.

To this end our invention consists in the novel construction and combination of parts herein shown and described and more particularly pointed out in the claims.

In the drawings, wherein like reference characters indicate like or corresponding parts, Figure 1 is a section view through our improved form of apparatus.

In referring to the drawing the apparatus is shown constructed with three evaporating or vacuum pans, A, B and C, it being understood that any number of pans, either more or less, may be employed in each piece of apparatus. The device consists of a shell or casing 1, consisting of one or any desired number of sections suitably secured together, and of the desired size and shape, the same being provided with a top section 2 which is preferably connected to a section 3 extending to a condenser or its equivalent. Each pan consists of parts 4 and 5, preferably inclined, together with the tube plates 6 and 7 and an inner shell 8, 9 being tubes connecting the two plates 6 and 7. The upper part between the pan or part 5 and shell is sealed so that there can be no escape of steam or vapors from the steam or heating chamber S to vapor space above the tubes. The other pans B and C, etc., are similarly formed. We show a feed pipe 10 through which the juices or liquid to be concentrated may be fed into the pan, 11 being a drain or discharge pipe from which the same may be drawn off. Exhaust steam or its equivalent is admitted to the steam chamber or space S by means of the feed pipe 12 or its equivalent, and the same surrounds the pan and tubes 9, thoroughly heating the contents of the pan and evaporating and concentrating the juices or liquid. A suitable outlet shown at 12$^a$ permits the drawing of the condensed vapors from the steam chamber S.

The vapors or steam arising from the concentrated liquid in pan A surround the pan B and heat juices or liquids in that pan causing an evaporation and concentration therein. Likewise the vapors arising from the pan B heats pans C and its contents, and so on. The vapors from the top, or as shown, from pan C, are drawn off through a pipe 3. It will of course be appreciated that the action of such a device will result in the successive heating of the various pans, each at a progressively decreased degree of temperature, that is the lower pan A will be of the highest temperature and the pan C at the lowest temperature, while the intermediate pan B will be between the temperatures of pan A and pan C.

Air or vapor pipes 15 are shown projecting into the chamber S from the manifold 16 so that the air may escape from the chamber and permit the steam to enter. Similar air pipes for the other pans are connected with the pipes 17 and takes the air or vapors from the other chambers. These pipes may be connected with the condenser if desired. Drain pipes 14 and 22 are also provided for drawing off the water or condensed vapors and preventing the same from accumulating. The pan B as shown is provided with an independent feed pipe 18 and drain 19 and pan C with an independent feed pipe 20 and drain pipe 21. In addition a pipe 23 is provided through which liquid may be drawn from pan A and discharged into pan B or through pipe 24' into pan C and a pipe 24 is shown through which the liquid may be drawn from pan B and discharged into pan C. We have not considered it necessary to illustrate all the forms of piping which might be arranged to conduct the fluid from one pan to the other as the preference of the various users might vary in this respect.

The apparatus is shown with a shaft 27 extending down through the pans, suitable means being provided for preventing the leakage or escape of the liquids from one pan to the other and an agitator or stirring device 26 is provided in each pan for stirring and positively causing a circulation in the pans. The agitators have a tendency to force the flow of the liquids in the preferred construction downward at the center of the pan and the same thence ordinarily travels up through the tubes 9 to the top of the pan, whence they are circulated downwards, etc. Ordinarily the pans are filled substantially to the point indicated by the line 18.

In this manner the heated vapors arising from one pan serve to heat, evaporate and concentrate the contents of the pan above, and being discharged directly on the pan and about the tubes, the same is utilized substantially at once without having any opportunity to cool. By arranging the two or more vacuum pans as shown, limited floor space in addition to increased efficiency of the device is acquired.

Having thus described our invention, it is obvious that various immaterial modifications may be made in the same without departing from the spirit of our invention, hence we do not wish to be understood as limiting ourselves to the exact construction, arrangement and combination of parts herein shown and described or uses mentioned.

What we claim as new and desire to secure by Letters Patent is:—

1. In the apparatus of the kind described and in combination, a casing, a plurality of pans arranged therein, one above the other, the spaces above the pans being closed to the spaces below, each of the upper pans having a depending inner shell extending into the space above the next lower pan, and an enlarged chamber arranged at the lower end of said inner shell and in communicaton therewith and a series of tubes affording a communication between the chamber and the pan, and means for heating the lowest pan to cause the heated vapors to rise and heat the pan above and the vapors from the above pan to rise and heat the next adjacent pan above.

2. In an apparatus of the kind described and in combination, a casing, a plurality of pans arranged therein, one above the other, and having their peripheral edge in sealed contact with the inner surface of the casing, each of the upper pans having a depending inner shell extending into the space above the next lower pan, and an enlarged chamber arranged at the lower end of said inner shell and in communication therewith and a series of tubes affording a communication between the chamber and the pan, and means for heating the lowest pan to cause the heated vapors to rise and heat the pan above and the vapors from the above pan to rise and heat the next adjacent pan above.

3. In the apparatus of the kind described and in combination, a casing, a plurality of pans arranged therein, one above the other, the spaces above the pans being closed to the spaces below, each of the upper pans having a depending inner shell extending into the space above the next lower pan, and an enlarged chamber arranged at the lower end of said inner shell and in communication therewith and a series of tubes affording a communication between the chamber and the pan, means for heating the lowest pan to cause the heated vapors to rise and heat the pan above and the vapors from the above pan to rise and heat the next adjacent pan above, and means for forcing the circulation through the conduit, the enlarged chamber and the tubes.

4. In the apparatus of the kind described and in combination, a casing, a plurality of pans arranged therein one above the other, the spaces above the pans being closed to the spaces below, each of the upper pans having a depending inner shell extending into the space above the next lower pan, and an enlarged chamber arranged at the lower end of said inner shell and in communication therewith and a series of tubes affording a communication between the chamber and the pan, means for heating the lowest pan to cause the heated vapors to rise and heat the pan above and the vapors from the above pan to rise and heat the next adjacent pan above, and agitating means arranged in the enlarged chamber for forcing the circulation in the pan.

In testimony whereof, we have hereunto signed our names in the presence of two subscribing witnesses.

THOMAS RAY.
JOSHUA R. RAY.

Witnesses:
CLARA BENSON,
J. C. ANDERSEN.